United States Patent
Kopf

(12) 
(10) Patent No.: US 6,466,604 B1
(45) Date of Patent: *Oct. 15, 2002

(54) OPTICAL COMPONENT FOR GENERATING PULSED LASER RADIATION

(76) Inventor: Daniel Kopf, St. Moritzstrasse 9, CH-8006, Zurich (CH)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 298 days.

(21) Appl. No.: 08/952,478

(22) PCT Filed: May 15, 1996

(86) PCT No.: PCT/CH96/00185
§ 371 (c)(1),
(2), (4) Date: Nov. 19, 1997

(87) PCT Pub. No.: WO96/36906
PCT Pub. Date: Nov. 21, 1996

(30) Foreign Application Priority Data

May 19, 1995  (CH) .............................................. 1499/95

(51) Int. Cl.⁷ .............................. H01S 3/08; G02B 1/10
(52) U.S. Cl. ........................... 372/99; 359/584; 372/18; 372/25
(58) Field of Search ........................... 372/99, 102, 49, 372/11, 18, 20, 25; 359/584, 586, 589

(56) References Cited

U.S. PATENT DOCUMENTS

| | | | |
|---|---|---|---|
| 4,860,296 A | 8/1989 | Chemia et al. | 372/44 |
| 5,265,107 A | 11/1993 | Delfyett, Jr. | 372/11 |
| 5,627,854 A | 5/1997 | Knox | 372/99 |

FOREIGN PATENT DOCUMENTS

| | | |
|---|---|---|
| EP | 0 541 304 A1 | 5/1993 |
| EP | 0 609 015 A1 | 8/1994 |
| EP | 073261382 | * 9/1996 |
| WO | WO 85/03171 | 7/1985 |

OTHER PUBLICATIONS

Brovelli et al, "Self-starting Soliton Mode-locked Ti-Sapphire Laser Using a Thin Semiconductor Saturable Absorber", Electronics Letters, vol. 31, No. 4, pp. 287–289, Feb. 1995.*

"Revolution in the Generation of Ultra-Short Pulses," U. Keller, TR Transfer No. 23, 1994, pp. 22–24. (No Month).

"Laser Principles and Applications," H. Weber et al., Physik Verlag GMbH, Weinhein/Bergstr., 1972, pp. 144–157, (No Month).

"Principles of Optics," M. Born et al., Pergamon Press, 1975, pp. 55–70, (No Month).

(List continued on next page.)

Primary Examiner—James W. Davie

(57) ABSTRACT

The optical component designed preferably for use in a laser cavity for the generation of a pulsed laser beam, especially a mode-coupled beam in the microsecond to the femtosecond range, contains a coating ensemble that acts as a saturable absorber, contains several layers, and is wave-coupled and "etalon-free," having at least one saturable absorptive layer. The sequence of layers in the coating ensemble can be laid out such that for an incident cavity beam a negative dispersion of the group velocity (negative group delay dispersion and negative group velocity dispersion) also results. In the optical component which acts among other things as a saturable absorber and can be used as such, separate, individual, discrete optical elements need not be assembled in a sandwich-type construction with minimization. Instead, the optical component is a coating ensemble in which each individual layer, together with the remainder of the ensemble, contributes to the phase-coupled overall behavior of the incident beam. One or more layers which exhibit the saturable absorptive properties may be positioned in this ensemble, naturally allowing for phase-constant relations, such that an optimal, in this case a saturable absorptive, effect can be achieved.

25 Claims, 11 Drawing Sheets

OTHER PUBLICATIONS

"Generalization of Bragg refletor geometry: Application to (Ga,Al)As–(Ca,Sr)$F_2$ reflectors," C. Fontaine et al., J. Appl. Phys. 68, (10), Aug. 1990, pp. 5366–5368.

"Design and Operation of Antiresonant Fabry–Perot Saturable Semiconductor Absorbers for Mode–Locked Soid–State Lasers," L.R. Brovelli et al., Journal of the Optical Society of America B, vol. 12, No. 2, Feb. 1995, pp. 311–322.

Waves and Fields in Optoelectronics, 1984, Prentice–Hall Inc., Englewood Cliffs, New Jersey 07632, ISBN 0–13–946053–5, pp. 31–46. (No Month).

"Nonlinear Bragg reflector based on saturable absorption," B.G. Kim et al., Appl. Phys. Lett., vol. 54, No. 12, pp. 1095–1097, Mar. 1989.

"Non–Linear Response of Absorbing GaAs/GaAlAs Bragg Reflectors," G. Le Saux et al., J. Optics (Paris), vol. 21, n.3, pp. 111–114, 1990 (No Month).

"Broadband fast semiconductor saturable absorber," G.R. Jacobovitz–Veselka et al., Optics Letter, vol. 17, No. 24, pp. 1792–1793, Dec. 15, 1992.

"Chirped multilayer coatings for broadband dispersion control in femtosecond lasers," Robert Szipöcs et al., Optics Letters, vol. 19, No. 3, pp. 201–203, Feb. 1, 1994.

M. H. Ober, M. Hofer, U Keller and T. H. Chiu, "Self–starting diode–pumped femtosecond Nd fiber laser", Optics Letters, vol. 18, Sep. 15, 1993.

* cited by examiner

OPTICAL COMPONENT FOR GENERATING PULSED LASER RADIATION

BACKGROUND OF THE INVENTION

1. Field of the Invention

The invention relates to an optical component designed preferably for use in a laser configuration, for the generation of a pulsed laser beam, especially a pulsed beam in the micro- to femtosecond range, and for use in an optical layout for a pulsed laser.

2. Description of the Background Art

Short pulses in the micro- to femtosecond range can be generated via mode coupling, Q-switching, or mode-coupled Q-switching within a laser cavity. This can be accomplished using a saturable absorber positioned in the laser cavity. The saturable absorbers used are dyes or semiconductors whose absorption capacity decreases with increasing beam intensity. In this manner, a coupling of the different resonant cavity modes to the short pulses oscillating in the cavity occurs, as is graphically described in H. Weber/G. Herziger, Laser-Grundlagen und Anwendungen [Laser Principles and Applications], Physik Verlag GmbH, Weinheim/Bergstr., 1972, pp. 144 ff.

This made it possible to design saturable absorbers, for example, as so-called "antiresonant Fabry-Perot saturable absorbers," as is described in U. Keller, "Revolution in the Generation of Ultra-Short Pulses," TR Transfer No. 23, 1994, pp. 22–24. In these known-in-the-art saturable absorbers, a semiconductor absorber was used, which was integrated into a Fabry-Perot interferometer, approximately 400 $\mu$m thick, with a sandwich-type construction. This sandwich-type construction comprised, as with a Fabry-Perot (etalon), two reflector elements. The space between the two reflector elements was taken up by the saturable absorbing semiconductor material. The distance between the two reflective elements was such that the beam intensity inside the Fabry-Perot was always much lower than the incident intensity. In other words, the Fabry-Perot was operated in antiresonance. This sandwich-type construction is described in EP-A 0 609 015 (U.S. Pat. No. 5,345,454) and in EP-A 0 541 304 (U.S. Pat. No. 5,237,577), among other places.

A further sandwich-type construction for a saturable absorber is known in the art from L. R. Brovelli, et al., "Self-Starting Soliton Mode-Locked Ti-Sapphire Laser Using a Thin Saturable Absorber, Electronics Letters, Vol. 31, No. 4, 1995, pp. 287–288. In the "sandwich absorber" described here (see right column p. 287, second paragraph from the top), only one of the two Fabry-Perot reflectors is replaced by an antireflective film, that is, an antireflective coating; the saturable absorbing material is positioned in this case between the two cover elements of the sandwich.

SUMMARY OF THE INVENTION

With the optical component, which acts as and can be used as a saturable absorber in accordance with the invention, separate, individual, discrete optical elements, as have long been known in the art, are no longer assembled in a sandwich-type construction with the goal of minimization; instead, an "etalon-free" coating ensemble is created, in which each individual layer, together with the remainder of the ensemble, contributes to the overall phase-coupled behavior of the incident beam. The term etalon-free coating ensemble is understood to mean a coating which contains no locally quantifiable etalon. Only with this design formalism, and the resulting computational formalism, is it possible to position one or more layers having the saturable absorbing properties in this ensemble, allowing, of course, of the phase-coupled interrelations, such that an optimal, in this case saturable absorptive effect can be achieved.

In the invention, a coating is used, which no longer simply acts overall as an addition to the properties of the individual partial layers. The object is first and foremost to compose the overall coating ensemble. Only after this has been completed can the property of the ensemble be determined (mathematically, as with a filter calculation).

The invention uses a coating ensemble comprised of a multitude of layers, wherein only one removal or one modification of a single layer can change the entire nature of the coating. In contrast to the above-described sandwich construction, a matrix-type coupling of all the layers with one another is implemented here, such as is described, for example, in the theoretical observations of M. Born and E. Wolf, Principles of Optics, Pergamon Press, 1975, pp. 55–70. The modification of the physical data of a single layer (position in the ensemble, index of refraction, thickness of optical coating) will affect the properties of the overall coating.

Compared with the known-in-the-art sandwich-type construction, the optical component in the present invention can now be provided with the correct properties, via the proper calculation of the coating ensemble, to create an optimal resonator cavity. With the selection of the optical coating thicknesses and/or the coating material, and the positioning of these coatings in the ensemble, the properties of the ensemble can be set deliberately, as desired, and thus optimally adjusted. And more than just optical properties can be taken into consideration; for example, requirements regarding coating resistance, the precise frequency-based course of reflection, and especially, as is described in detail below, the optimal positioning of the absorber material, and thus its optimal impact, can be selected.

Because the construction of the coating ensemble produces a lower number of layers than the known-in-the-art sandwich-type construction, this coating can be produced more cost-effectively, using higher tolerances for the optical layer thicknesses to be used, and their indices of refraction. The outstanding "freedom of design," which permits a multitude of possible combinations in the construction of and materials used in the layers, has proven to be particularly advantageous.

BRIEF DESCRIPTION OF THE DRAWINGS

Below, examples of the optical components specified in the invention, along with the preferred application of these components, are described in greater detail with reference to the attached diagrams. Further advantages of the invention are described in the subsequent descriptive text. The diagrams as shown are given by way of illustration only, and thus are not limitative of the invention, wherein.

DETAILED DESCRIPTION OF THE PREFERRED EMBODIMENTS

Figure 1:
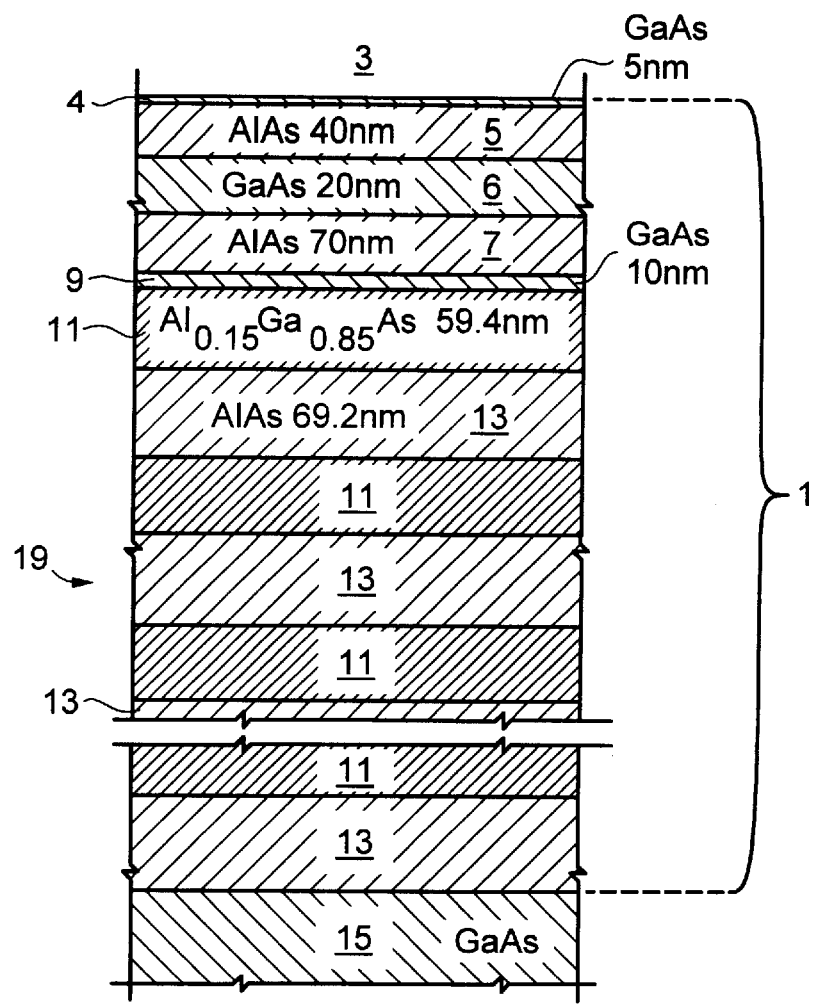
FIG. 1 illustrates a cross-section, taken in a normal surface direction, of a coating ensemble used, for example, as a saturable absorber.

FIG. 1 shows a cross-section through the layer construction of a coating ensemble 1, which acts simultaneously as a reflector and as a saturable absorber. Since a semiconductor, namely gallium arsenide, was used in this case as the saturable absorptive material, semiconductor materials that are related to gallium arsenide in terms of their structural make-up were used in the remaining layers, in order to obtain perfect growth during the coating process (low-temperature MBE-grown at approx. 400° C.).

Generally, a structure comprised of GaAs and AlGaAs layers is allowed to grow at normal MBE temperatures of approx. 600° C. Preferably, however, the layer containing the saturable absorbers is allowed to grow at lower temperatures, that is, between 200° C. and 600° C. In this manner, the recombination times for the load carriers generated by the laser pulse can be influenced, and can be adjusted to between 100 fs [femtoseconds] and a few nanoseconds. This recombination time is adjusted to coincide with the required properties of the laser, as is described in L. R. Brovelli, et al., "Design and Operation of Antiresonant Fabry-Perot Saturable Semiconductor Absorbers for Mode-Locked Solid-State Lasers," Journal of the Optical Society of America B, Vol. 12, 1995, pp. 311–322. In other words, in the coating ensembles 1 and 42 described here in the examples, only layers 6 and 39, mentioned below, are allowed to grow at a temperature of 400° C.

Starting from the coating surface (air interface layer 3), the coating ensemble 1 comprises a 5-nm-thick gallium arsenide layer, the covering layer 4 (GaAs); then a 40 nm-thick aluminum arsenide layer 5 (AlAs); a 20-nm-thick gallium arsenide layer 6 (GaAs) as the saturable absorptive material; a 70-nm-thick aluminum arsenide layer 7; a 10-nm-thick gallium arsenide layer 9; and then preferably 25 double layers comprised of a 59.4-nm-thick gallium arsenide layer 11 doped with aluminum ($Al_{15\%}Ga_{85\%}As$) and a 69.2-nm-thick aluminum arsenide layer 13. The entire coating ensemble 1 is deposited on a gallium arsenide substrate 15.

Figure 2:
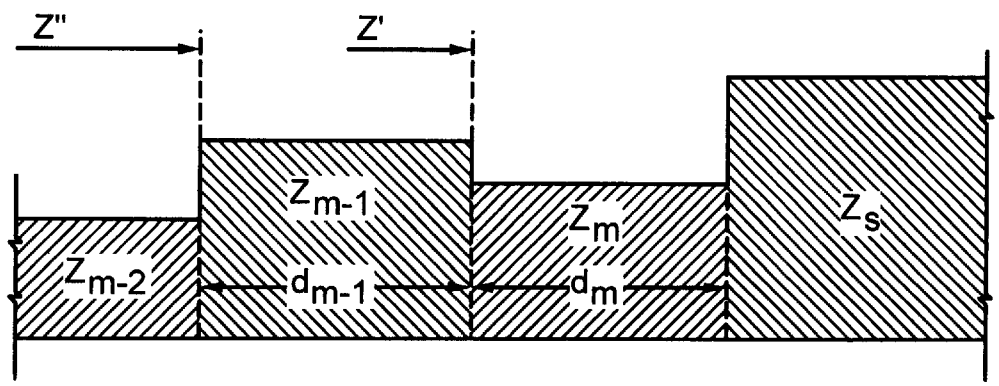
FIG. 2 illustrates a schematic representation of characteristic wave impedances for a random coating ensemble, illustrating the procedure for calculating total reflection.

The calculation of the reflection of the coating ensemble 1 follows in accordance with the theory of the adaptation to electrical wave impedances by Hermann A. Haus, Waves and Fields in Optoelectronics, 1984, Prentice-Hall Inc. Englewood Cliffs, N.J. 07632, ISBN 0-13-946053-5, pp.31–46, employing the symbols used in FIG. 2.

The wave impedance of a layer $Z_X$ is the wave impedance $Z_0$ of free space (approximately that of air) divided by the index of refraction (square root of the relative dielectric constants with a relative magnetic permeability of 1, which is generally a given here). The wave impedance $Z_0$ of free space is approximately 376.7 Ω.

From the electric wave theory, the following is then true for the transformation of the wave impedances:

$$Z'=Z_m[Z_s/Z_m+j\,\tan(2\pi d_m/W)]/[1+j(Z_s/Z_m)\cdot\tan(2\pi d_m/W_m)]$$

"j" indicates the imaginary number in a complex notation, $Z_S$ is the wave impedance of the substrate, in this case that of gallium arsenide, Z' is the transformed wave impedance, as it would be "seen" by a wave that was separated from the wave impedance $Z_S$ of the substrate by a spacer having the wave impedance $Z_m$ and the width $d_m$;

$W_m$ is the wavelength of the radiation frequency observed in the material of the layer, having the wave impedance $Z_m$, that is, the respective index of refraction $n_m \cdot W_m = W_0/n_m$, wherein $W_0$ is the wavelength of the beam in free space.

For the wave impedance Z", as a wave "would see it" if a further impedance wave segment $Z_{m-1}$ having a thickness of $d_{m-1}$ were connected in the series, the following is logically true:

$$Z''=Z_{m-1}[Z'/Z_{m-1}+j\,\tan(2\pi d_{m-1}/W_{m-1})]/[1+j(Z'/Z_{m1})\cdot\tan(2\pi d_{m-1}/W_{m-1})]$$

Figure 3:
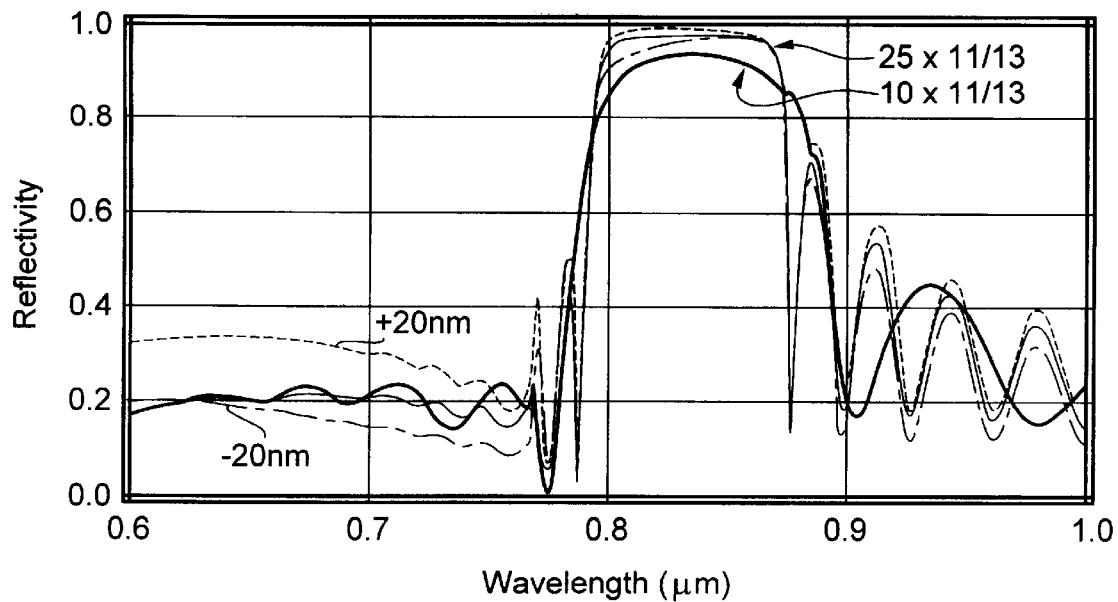
FIG. 3 illustrates The reflection sequence for the coating ensemble illustrated in FIG. 1, with a vertical incidence of radiation, or radiation having a wavelength in free space of between 0.6 and 1.0 $\mu$m, wherein the absorbing layer, in the case of the same overall ensemble thickness, lies 20 nm closer to the surface, and, in terms of a normal position, lies 20 nm further away from this surface.

The reflection R of the overall coating ensemble 1 is then calculated as follows:

$$R=[(1-Z_{m-x}/Z^X)/(1+Z_{m-x}/Z^X)]^2$$

wherein $Z^X$, is the wave impedance that has been transformed to the layer surface, and $Z_{m-x}$ is the wave impedance of the medium that borders on the uppermost layer, in this case air. The reflection progression of the above-described coating ensemble 1 is illustrated in FIG. 3. The idea here is to compensate for the dependence of the wavelength upon the structure of the coating ensemble 1 with the absorption provided by the absorptive material for a predetermined wavelength range. This can be accomplished via the selection of the proper positioning of the absorptive layer 6. To illustrate this idea more clearly, the reflection factor of the ensemble 1 is shown here, with a positioning of the absorbing layer 6 in relation to the position illustrated in FIG. 1, shifted once 20 nm toward the outside (indicated by a dashed line) and then shifted 20 nm toward the inside (indicated by a dotted line). The line derived from this is the wavelength of the average frequency of 830 nm, upon which the mode-coupled laser opprates.

The progression of intensity parallel to the normal surface in the coating is calculated from the electric field strength, in a manner similar to the above-described reflection factor, wherein here, as above, the phase relationships of the reflections of the partial waves to the inner boundary surfaces must be superimposed, phase-constant, such as is presented, for example, in the above-described publication by Hermann A. Haus.

Figure 4:
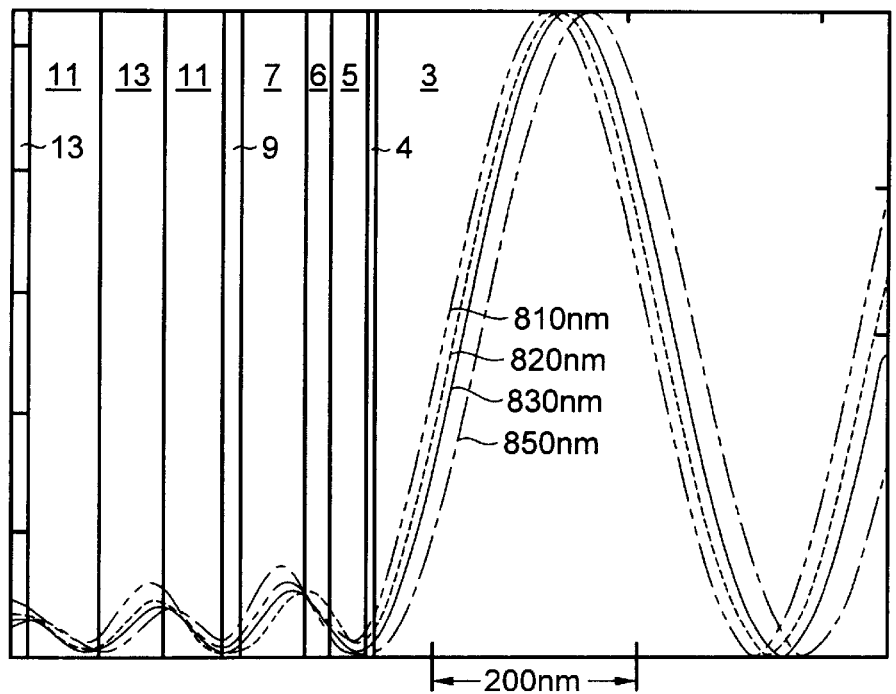
FIG. 4 illustrates the normalized progression of intensity within the coating ensemble (the positioning of the individual dielectric layers corresponds to that of FIG. 1) for wavelengths of 810 nm, 820 nm, 830 nm, and 850 nm (free space), wherein the curve derived from this shows the wavelength of the average frequency of 830 nm of the mode-coupled laser in an arrangement as illustrated in FIG. 5.

The progression of intensity within the coating ensemble 1 illustrated in FIG. 1, for three different wavelengths in free space, 830 nm, 840 nm, and 850 nm, is illustrated in FIG. 4. The wavelength data are always based upon those for free space.

Figure 5:
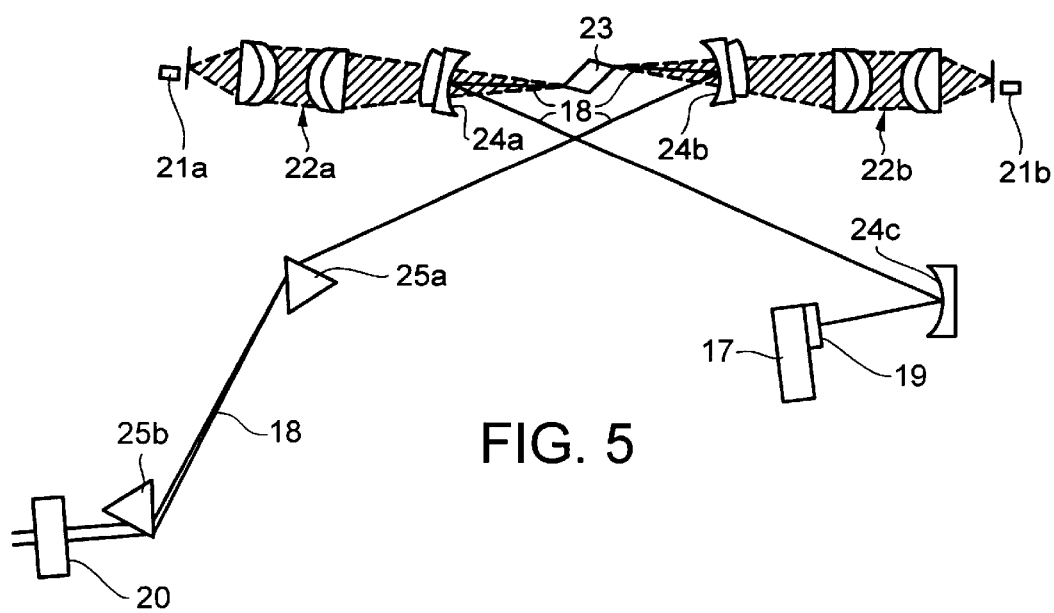
FIG. 5 illustrates an illustration of an optical construction for a pulsed laser.

A generation of short, mode-coupled pulses, especially in the microsecond range, can be achieved using the arrangement of optical components illustrated in FIG. 5. This arrangement comprises a coating ensemble 19 that is mounted on a heat sink 17 and acts as a laser cavity reflector with a saturable absorber, that has, in accordance with the above-described coating ensemble 19, its maximum reflection at 840 nm, and that acts as a nearly 100% reflector with a 1–2% saturable absorber. The other cavity reflector 20, which acts as a coupling-out reflector, has a reflection of 98% and a specialized coating, which will not be discussed any further here. A Cr:LiSAF crystal 23 (chromium-doped lithium strontium aluminum fluoride crystal LiSrAlF$_6$), with a thickness of 5 mm and a chromium content of 3%, serves as the active medium. The active medium is optically pumped on each side by laser diodes 21a and 21b, which are manufactured by the Applied Optronics firm, type AOC-670-400, and have a wavelength of 670 nm, and an output of 400 mW. The optical pumping path in FIG. 5a is indicated as a dashed line to differentiate it from the derived cavity optical path 18. The radiation from the diodes 21a and 21b is beamed into the active medium 23 via the focusing system 22a or 22b. The optical path in the cavity is formed and deflected via three reflectors 24a, 24b, and 24c, each of which has a concave reflection surface (radius of curvature on the surface for the two "upper reflective surfaces in FIG. 5a amounts to 10 cm, and for the two lower, 20 cm). The two prisms 25a and 25b, which are positioned at a distance of 59 cm from one another, are used to generate a negative dispersion of the group velocity in the laser cavity. This negative dispersion of the group velocity is necessary to the generation of the above-mentioned short pulses.

Figure 6:
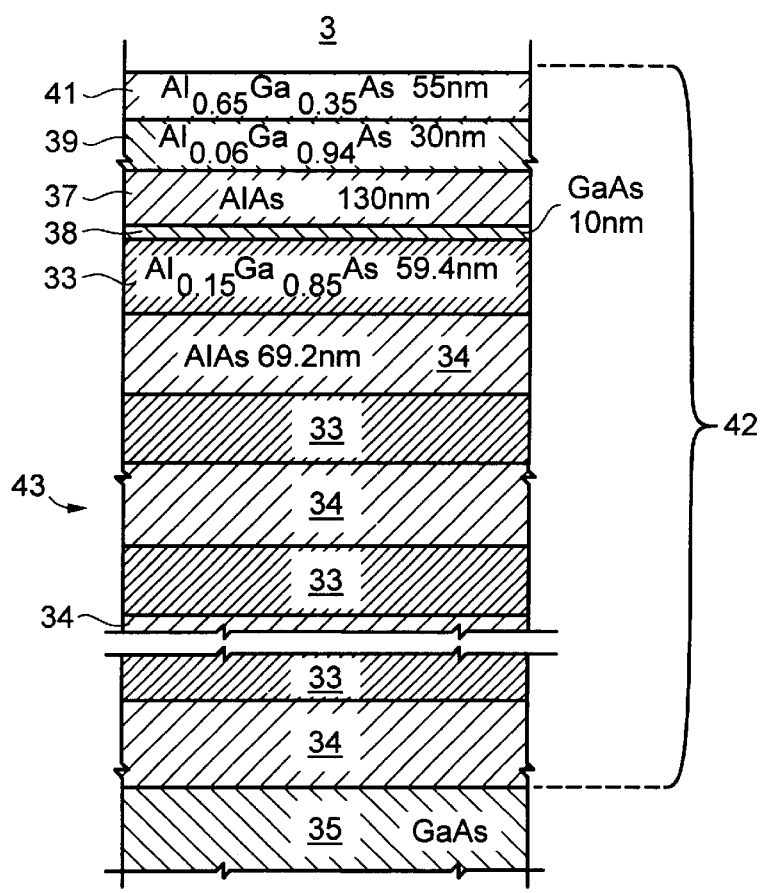
FIG. 6 illustrates a variation on a coating ensemble as illustrated in FIG. 1 with which, in addition to saturable absorption, a negative group velocity dispersion can be achieved.

One variation on the coating ensemble illustrated in FIG. 1 is shown in FIG. 6. The double-layer sequence of coatings 33 and 34 and the material of the substrate 35 are identical to those shown in FIG. 1. On the layer 33 there now lies a 10-nm-thick GaAs layer 38, followed by a 130-nm-thick intermediate layer 37 of aluminum arsenide (AlAs). This is followed by a 30-nm-thick saturable absorptive gallium arsenide layer 39, which is doped with aluminum. This layer 39 is preferably comprised of Al$_{6\%}$G$_{49\%}$As and is produced especially via a so-called "low-temperature MBE process" at approx. 400° C. The reflection of this ensemble 42, with a wavelength of 840 nm, is approximately 98% unsaturated.

With the proper selection of the doping, gallium arsenide layers can be adjusted from saturable absorbing layers to non-absorbing layers, dependent upon the radiation wavelength that occurs on them. Thus, with a doping of 0 to 6% aluminum, in which the gallium portion is replaced by that of the aluminum and the arsenide portion is allowed to remain constant, the absorption limit will shift from 870 nm to 830 nm. With an aluminum content of 15%, the absorption limit is already at 800 nm. The layer construction was designed here to create a negative dispersion of the group velocity of the radiation waves in the laser cavity. It is further ensured that there is sufficient growth of the appropriate coating, and a high level of resistance, even in the case of high radiation intensities.

Naturally, other material compositions, such as SiO$_2$ and TiO$_2$, as is described in R. Szipöcs, et al., "Chirped Multilayer Coatings for Broadband Dispersion Control in Femtosecond Lasers," Optics Letters, Vol. 19, No. 3, 1994, pp. 201–203, may also be chosen. But the coating ensemble described by Szipöcs, et al. generates only a negative dispersion of the group velocity. That layer construction, specifically as illustrated in FIG. 1 of that publication, must first be modified, based upon the findings in the invention, such that the saturable absorbing layers are integrated into predetermined positions in the coating ensemble. With the findings in the invention, the affected layers can be specifically integrated, so that not only is a negative dispersion of the wave velocity possible, the property of saturable absorption can also be optimally integrated. In order to accomplish this, it is necessary only for individual layers to be replaced with layers having the property of saturable absorption, without altering the phase relationships, similar to the progression of intensity over the layer construction shown in FIG. 4.

One variation on the coating construction described in the publication by R. Szipöcs, et al. is expounded upon in C. Fontaine, et al., "Generalization of Bragg Reflector Geometry: Application to (Ga, Al)As-(Ca,Sr)F$_2$ Reflectors," J. Appl. Phys. 68, (10), 1990, pp. 5366–5368. In accordance with the invention, the saturable absorptive layer or layers can then be integrated into the sequence of layers presented herein, in the manner presented above. With a construction of this type, pulse widths of less than 10 fs can be achieved.

Figure 7:
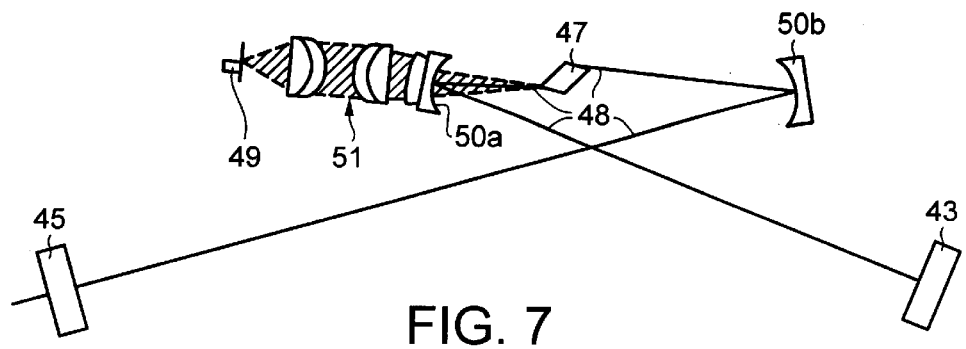
FIG. 7 illustrates an illustration of an optical construction for a mode-coupled laser containing the component illustrated in FIG. 6 as a cavity reflector.

FIG. 7 shows the cavity arrangement for a mode-locked laser, wherein one of the laser cavity reflectors 43 is coated with the above-described coating ensemble 42 to achieve maximum reflection at 840 nm, and is designed to be nearly a 100-% reflector. The other cavity reflector 45, which is designed to act as a coupling-out reflector, has a reflection of 99% and a specialized coating, which will not be discussed any further here. A Cr:LiSAF crystal 47 (chromium-doped lithium-strontium aluminum fluoride crystal LiSrAlF$_6$) with a thickness of 2 mm serves as the active medium, so that the optical path at a Brewster's angle amounts to 2 mm in the crystal, and has a chromium content of 3%. The active medium is optically pumped by a laser diode 49 manufactured by the Applied Optronics firm, type AOC-670-400, with a wavelength of 670 nm and an output of 400 mW. The optical pumping path is illustrated in FIG. 7 by a dashed line, to differentiate it from the derived cavity optical path 48. The radiation from the diode 49 is beamed into the active medium 47 via the focusing system 51. For the actual pumping process, 300 mW of the 400 mW then remain available. The optical path in the cavity is formed and deflected by two reflectors 50a and 50b, each of which has a concave reflection surface (radius of curvature of the outer surface is 10 cm). The distance between the cavity reflector 43 and the "deflecting reflector" 50a is 27 cm, and the distance between the coupling-out reflector 45 and the deflecting reflector 50b is 70 cm.

With a pump output of 300 mW, an average laser output of 25 mW with laser pulses of 160 fs is achieved. What is to be emphasized in the laser cavity arrangement selected here is the robust construction and the uncritical adjustment, compared with the adjustment required with the use of a so-called "Kerr lens mode locking." In this arrangement, the pair of prisms 25a and 25b, which are extremely difficult to adjust, can be omitted.

In place of one of the coating ensembles 19 or 43 that acts as a cavity reflector, one or more surfaces of the reflector 20, 45, 24a, 24b, 24c, 50a, or 50b may be provided with a similar, but not reflective, ensemble coating.

Rather than designing the above-described coating ensembles as reflectors, they may also be designed to act as antireflectors, and can then be positioned on one or both side faces of the active medium, or on one or more surfaces of the prisms 25a and/or 25b, or on other optical components within the laser cavity that are not illustrated here, in the cavity's optical path.

Rather than a single saturable absorptive layer 6 or 39 in the coating ensemble 1 or 42, naturally more of these layers may also be present. These layers need only lie in analogous positions in relation to the radiation intensity within the ensemble (see FIG. 4).

In addition to the above-mentioned semiconductor materials containing gallium, arsenide, and aluminum, other semiconductor materials, such as those based upon indium, phosphorous, fluorides ($CaF_2$, $BaF_2$, ...) may also be used.

FIGS. 8a through 8e show examples of various coating ensembles as variations on those shown in FIGS. 1 and 6. The width of the individual layers is illustrated in the "flat-topped curve" in the diagram sections α and β. To differentiate a given layer, its index of refraction n is plotted. Layers 53 of GaAs having an index of refraction of n≈3.5, alternate with layers 55 of AlAs having an index of refraction of n≈2.95. The coating ensembles in FIGS. 8a through 8e differ from one another in the uppermost three layers. "Upper" is considered the open coating end—the interface area to the air. The bottom diagram section γ in each case shows the progression of the reflection R of the overall coating ensemble over the wavelength lambda, in micrometers (μm) of incident radiation.

Figure 8A:
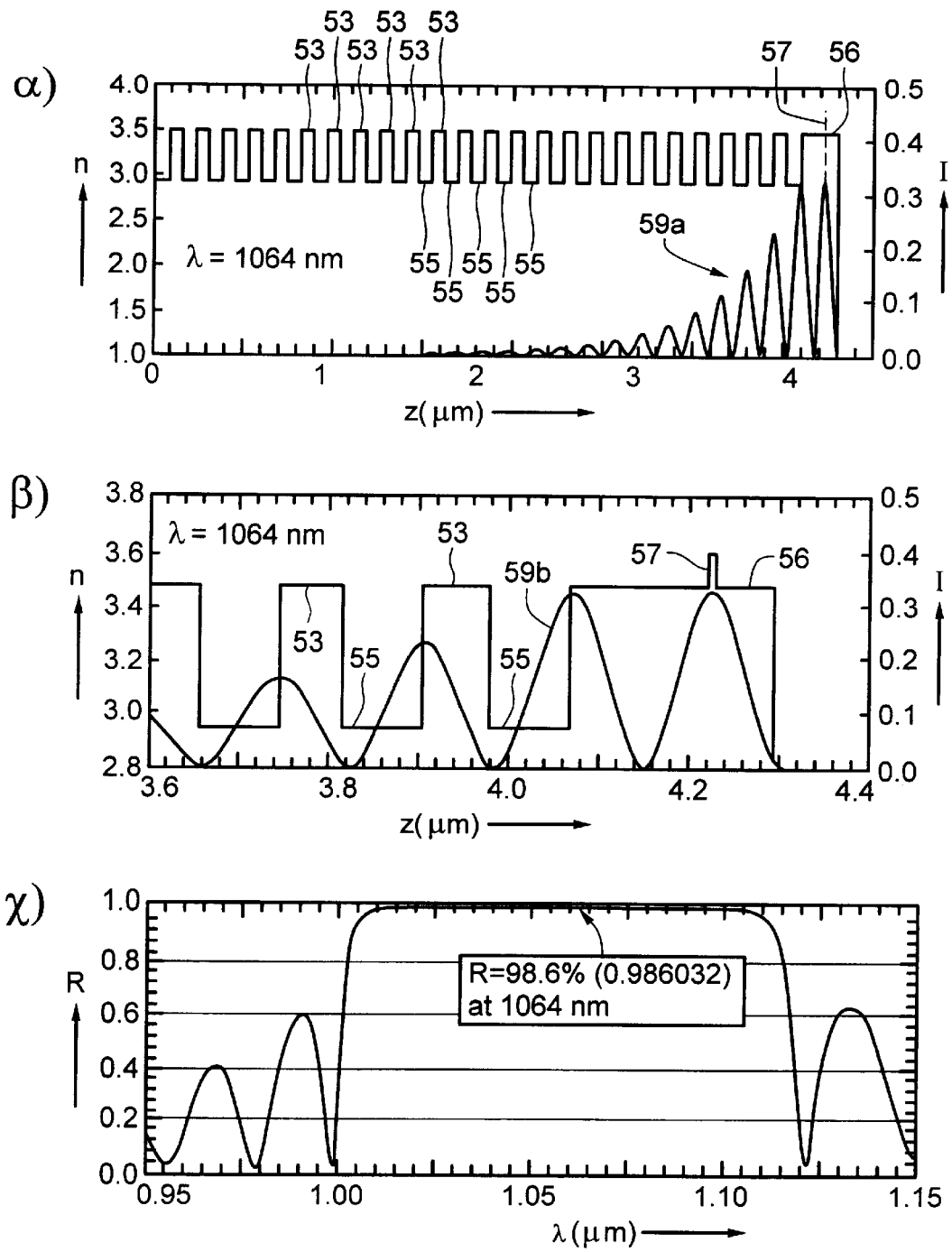
FIGS. 8a through 8e illustrates coating ensembles of varying designs, in each of which α represents the progression of intensity (I) in random units over the thickness (z in μm) of the overall ensemble; β represents the progression of intensity over a segment of the coating ensemble; and γ represent the reflection of the coating ensemble over the wavelength indicated on the abscissa axis in micrometers (μm)

In FIG. 8a, the uppermost layer 56 is a GaAs layer having an optical layer thickness of a quater wavelength, based upon 1.064 μm (free-space wavelength), which contains an absorbing partial layer 57 of InGaAs having an index of refraction of n≈3.6. Free-space wavelength is understood to mean the wavelength in free space (vacuum). In the affected layer, however, the value of the wavelength changes correspondingly in relation to the given index of refraction. The position of the absorbing partial layer 57 is selected such that it lies at the peak of the progression of intensity of a resonator wave. This position, along with the entire normalized intensity progression 59a of the laser cavity wave in the coating ensemble is shown in the diagram section α of FIG. 8a. A magnified illustration of the upper partial coating layers, in relation to the dimensions of coating thickness, is shown in the diagram section β of FIG. 8a. Here, as in the diagram section α, the intensity progression is indicated by 59b.

Figure 8B:
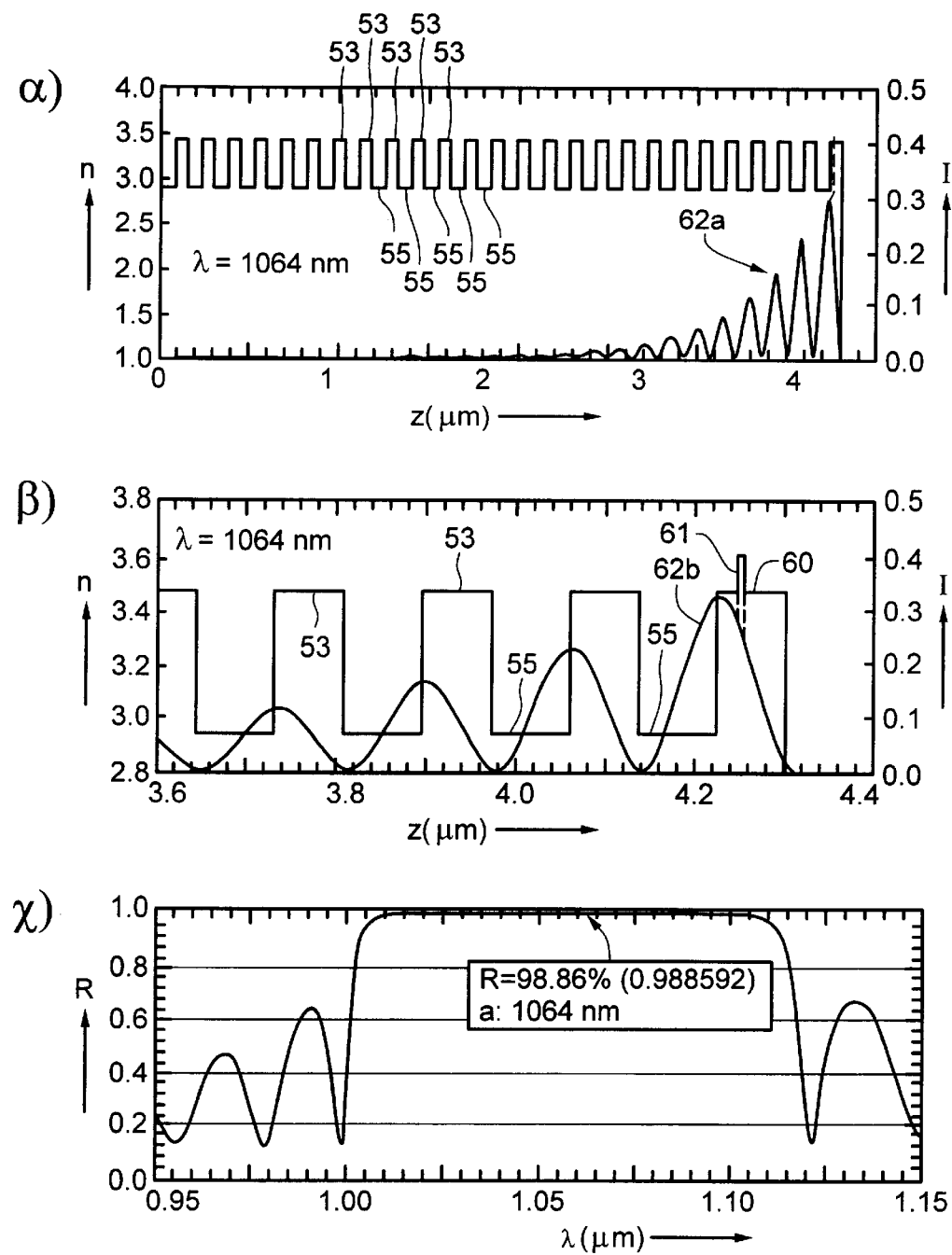

FIG. 8b shows a coating ensemble that is similar to that shown in FIG. 8a; in this case, however, the uppermost layer 60 is a GaAs layer has an optical layer thickness of a quarter wavelength based upon 1.064 μm. The absorbing layer 61 is also in this layer 60 in this case, but in the position of an intensity 62a or 62b that has already fallen off.

Figure 8C:
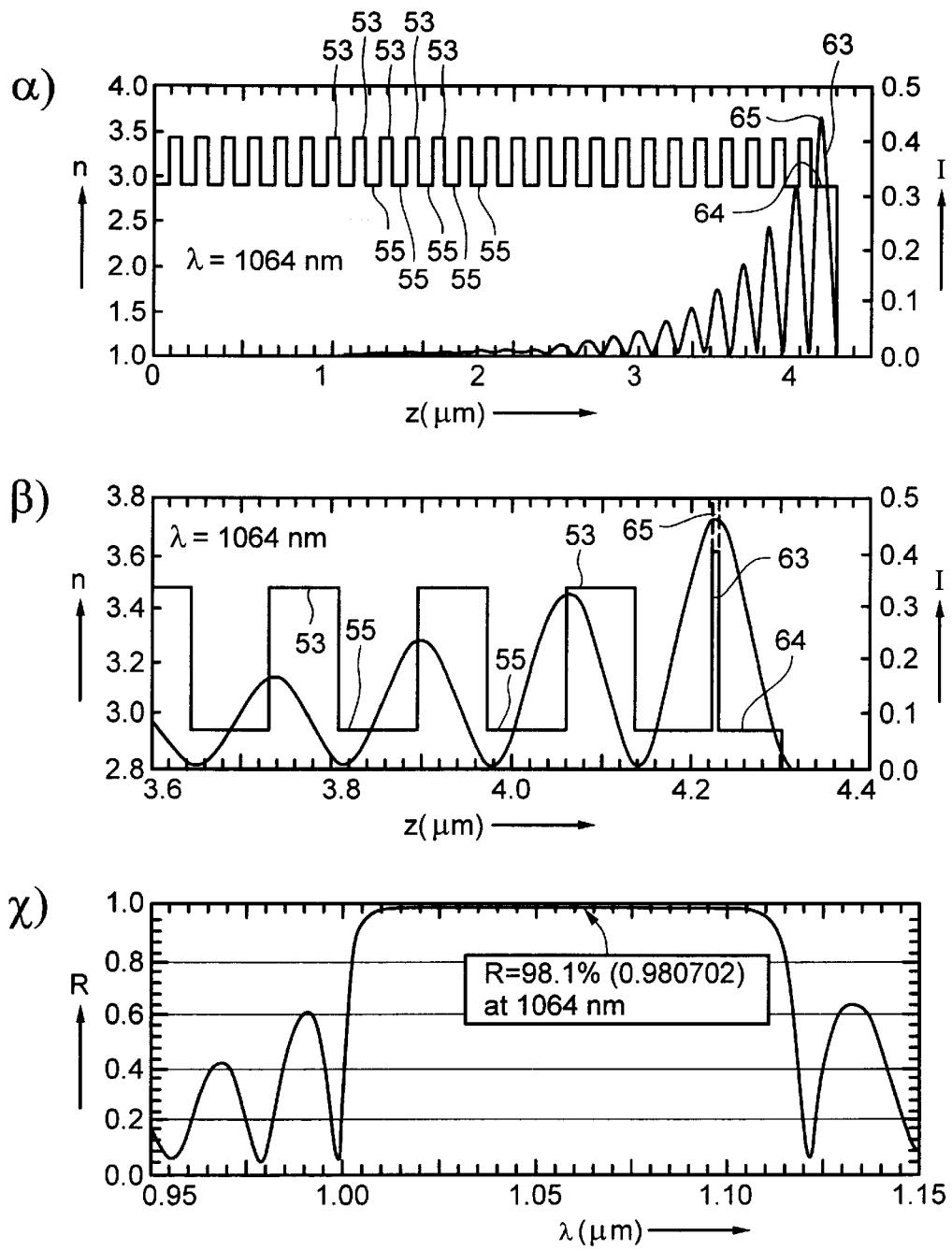

A further coating variation is shown in FIG. 8c. Here, the absorbing layer 63 is also included in the uppermost layer 64. In contrast to the above-described coating ensemble, here the uppermost layer 64 is a layer having a low index of refraction, namely n≈2.95, and comprised of AlAs. The optical layer thickness amounts to a half wavelength, based upon 1.064 μm. The absorbing layer 63 is positioned nearly in one of the intensity peaks, in this case in the absolute intensity peak 65.

Figure 8D:
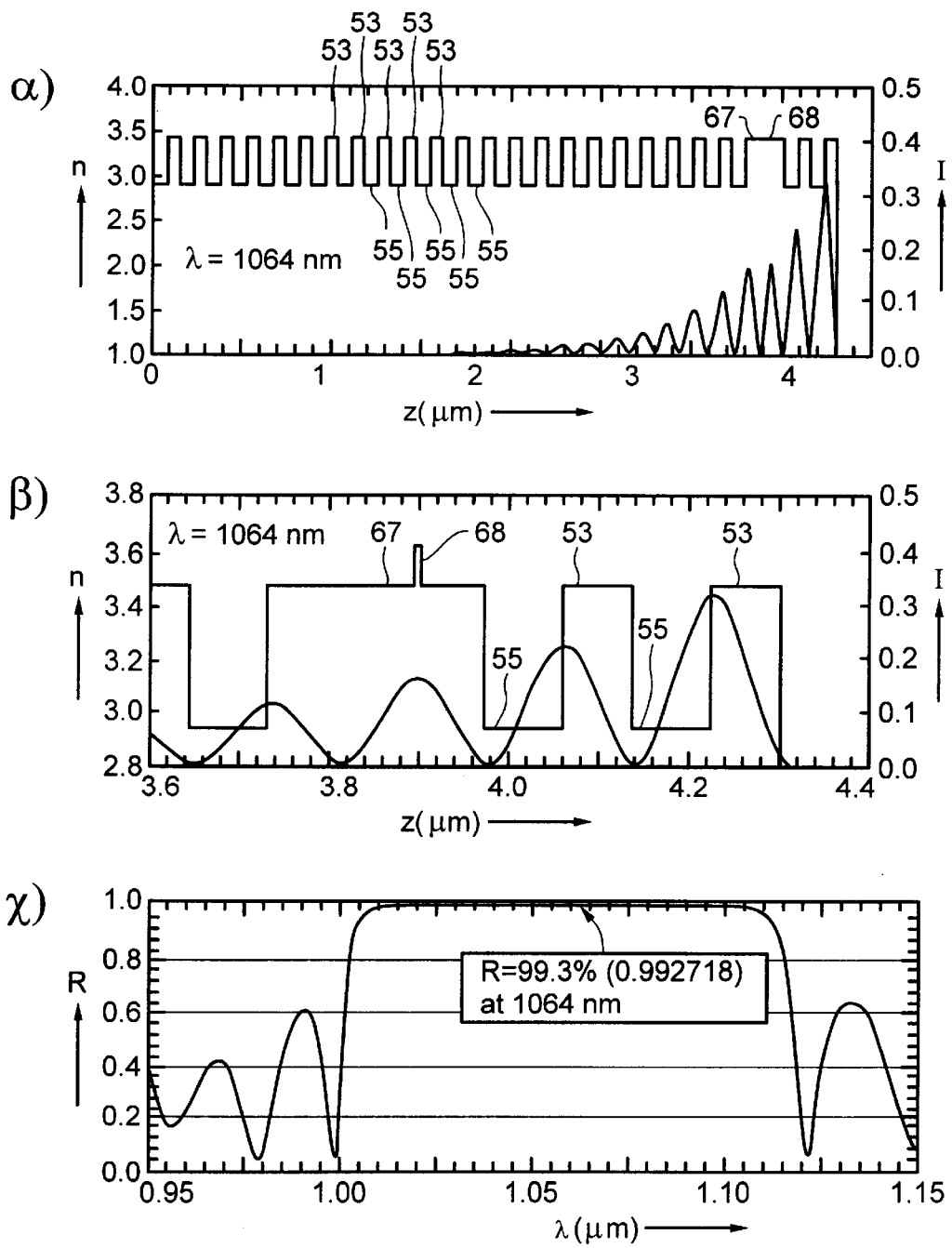
Figure 8E:
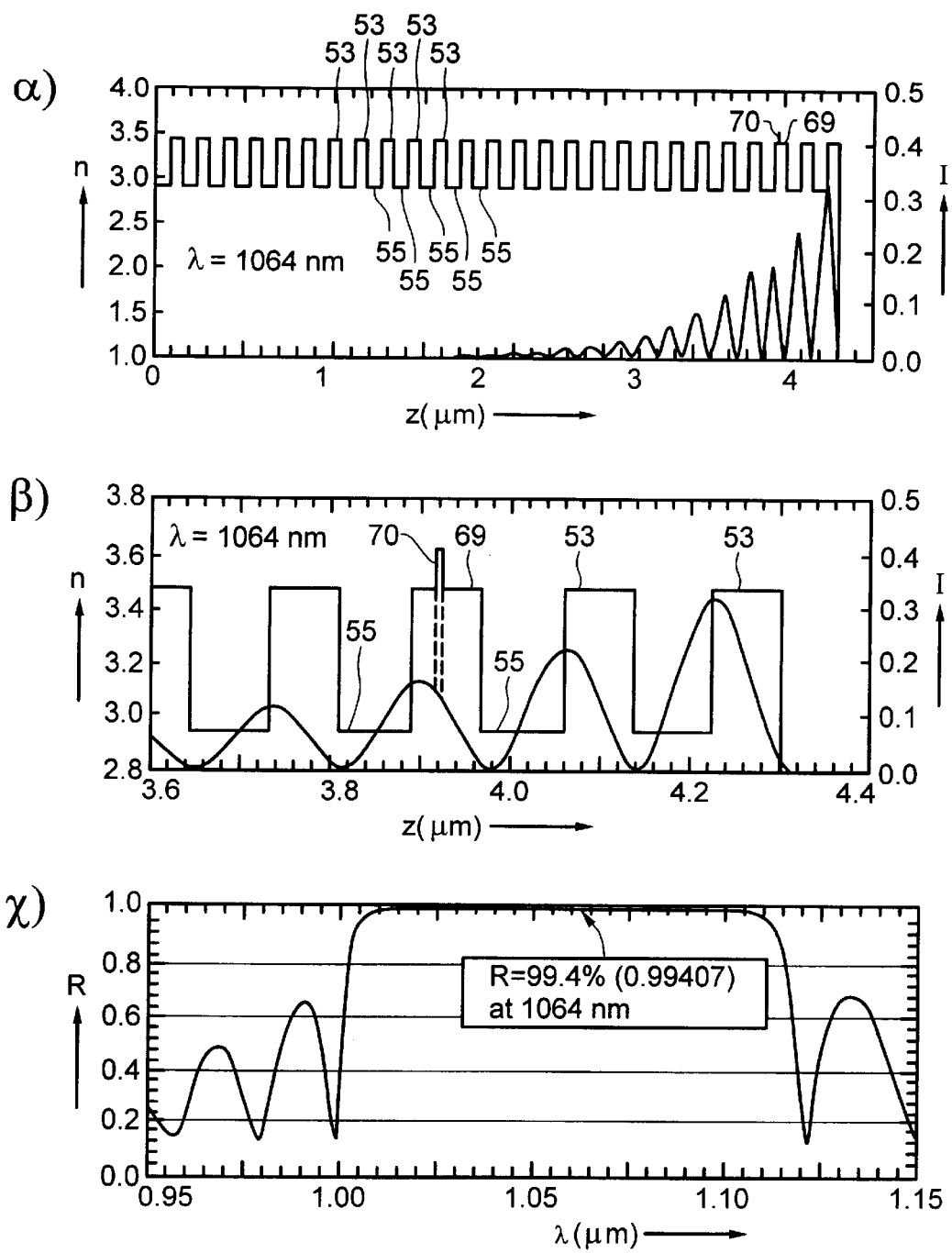

Further variations on coating ensembles are shown in FIGS. 8d and 8e. In contrast to the above-described ensembles, here the absorbing layer 68 or 70 is no longer in the uppermost layer, but is embedded in a lower lying layer, in this case, for example, in the third layer from the top 67 or 69. In FIG. 8d, the absorbing layer 68 lies nearly in the position of a relative intensity peak. In FIG. 8e, in contrast, the absorbing layer 70 lies in the area that has fallen off, following a relative intensity peak.

FIGS. 8a through 8e indicate a way in which the optimal positioning of the saturable absorber in the coating ensemble can be found. With a careful selection of the absorber position, a desired wide-band characteristic based upon the desired wavelength region can be achieved. In the examples illustrated here, a range of 50 nm was achieved. In addition, the effective saturation intensity, in other words that which is "seen from the outside," in the coating ensemble can be increased, for example, when the absorber is more deeply embedded, as is shown, for example, in FIG. 8d.

Figure 9A:
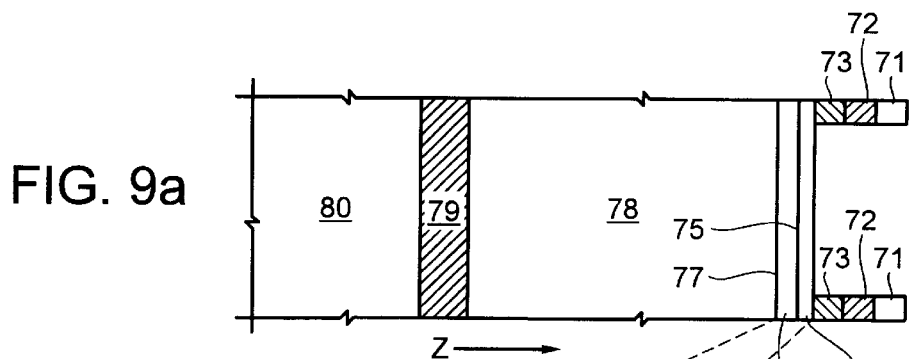
FIGS. 9a–9c illustrate a coating ensemble similar to that in FIG. 1, but with a metallic layer.
Figure 9B:
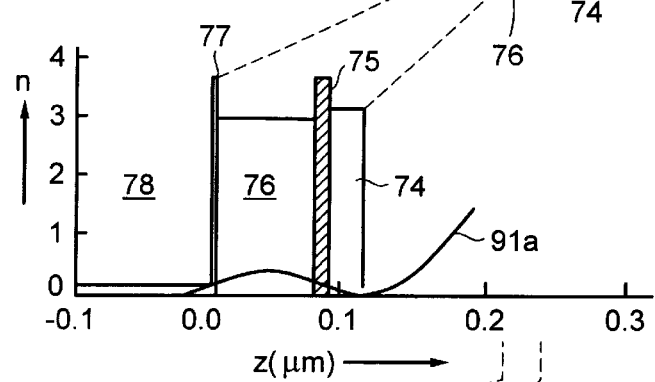
Figure 9C:
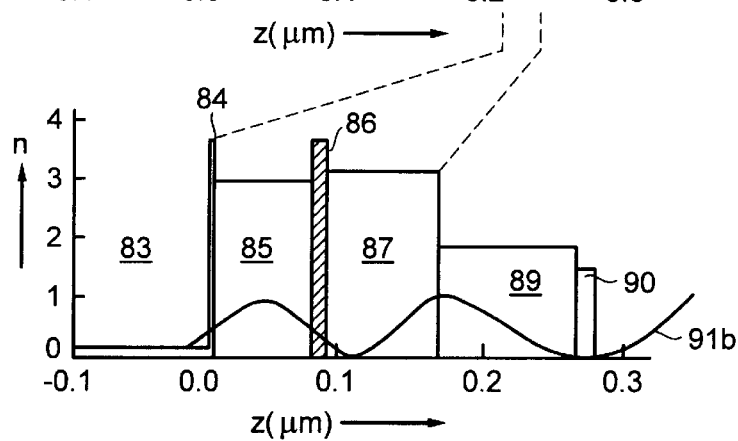

FIGS. 9a–9c show a wide-band coating ensemble containing a saturable absorber, similar to the above versions, and designed to enable the generation of pulsed laser radiation, with pulse widths in the 10 fs range [fs= femtosecond (1 fs=$10^{-15}$ seconds)], in a laser cavity that is not illustrated here. A Ti:sapphire-laser crystal having a thickness of 2 mm (not illustrated here) is used as the active laser material. The cavity reflectors are arranged 10 cm apart from one another, and the laser beam diameter in the absorbing layer described below amounts to 36 μm. The coupling-out reflector (not illustrated here) (one of the two cavity reflectors) couples 3% of the laser intensity out of the laser cavity. The coating ensembles shown in FIGS. 9b and 9c for use in the above-mentioned, not illustrated, laser cavity, in contrast to the coating ensembles of FIGS. 1, 4, and 8a through 8e, contain a metallic layer, in this case a silver layer. Other metallic layers, such as gold layers, for example, may also be present.

In contrast to a traditional coating process, here a new production process, which differs in principle from the known-in-the-art method, is used. In this process, as described below, the lowest metallic layer is the last one to be produced. In other words, the coatings are applied in reverse order.

In the production of the coating ensemble illustrated in FIG. 9b, as indicated in FIG. 9a, first a 300-nm-thick $Al_xGa_{1-x}As$ layer 72, in which x=0.65, is applied to a GaAs substrate 71. A 40-nm-thick GaAs layer 73 is then applied to this layer 72. This is then followed by another 20-nm-thick layer 74 of $AlGa_{1-x}As$ layer, in which x=0.65. Onto the layer 74, in a low-temperature process (400° C.), a 15-nm-thick GaAs absorbing layer 75 is applied, followed by a 70-nm-thick AlAs layer 76 and a 3-nm-thick GaAs layer 77, which will later prevent the oxidation of the layer 76. A 5-μm-thick layer of silver 78 is then applied to the layer 77.

Following completion of this coating process, the coated substrate 71 is divided into approximately 5 mm×5 mm pieces. These pieces are then bonded to a silicon substrate 80 using a two-component epoxy adhesive 79, in order to obtain sufficient heat dissipation. In the next step in the process, the pieces are heat treated at 80° C. for eight hours, under a 500 g surface weight. The GaAs substrate 71 is then lapped down to 100 µm and is etched in ammonia dissolved in hydrogen peroxide [NH$_4$OH:H$_2$O$_2$ (1:25)] with an etching rate at room temperature of approximately 6 µm per minute, up to layer 72. Layer 72 is then removed using hydrofluoric acid, down to layer 73. Layer 73 is etched away, as above, down to layer 71, using a low concentration of ammonia dissolved in hydrogen peroxide [NH$_4$OH:H$_2$O$_2$ (1:200)]. To obtain a good, even etching, the 5 mm×5 mm sized pieces must be moved. To protect the corners and the silver layer 78, a wax coating is used during the etching process. The protective coating of wax can later be removed using trichloroethene. The layers that are necessary for the production of the coating ensemble but are not optically usable are removed through the etching process. The uppermost layer is now layer 74.

The coating ensemble illustrated in FIG. 9c is produced in a manner similar to that illustrated in FIG. 9b. The layers 83, 84, 85, and 86 correspond to the layers 78, 77, 76, and 75 in the coating ensemble shown in FIG. 9b. In contrast to the ensemble illustrated in FIG. 9b, however, in 9c an 82-nm-thick AlGaAs layer 87 is present, on which an antireflective coating 89, having a protective layer 90, rests. In FIGS. 9b and 9c, the local progression of intensity is indicated by 91a or 91b.

The coating ensemble illustrated in FIG. 9b operates in the laser cavity (not illustrated here) with low quality in antiresonance. In this manner, an ultra-short pulse-width limitation, brought about by a change in reflection dependent upon expanded wavelengths, and by an increased group velocity dispersion, is prevented [see for example L. R. Brovelli, U. Keller, T. H. Chiu, J.Opt.Soc.Am. B 12, 311 (1995)]. The reflection of the coating ensemble is greater than 94% at 800 nm. The reflection path shows only a low wavelength dependency in the region between 700 nm and 1200 nm.

Rather than antiresonance, the coating ensemble illustrated in FIG. 9c can be used in resonance.

Figure 10:
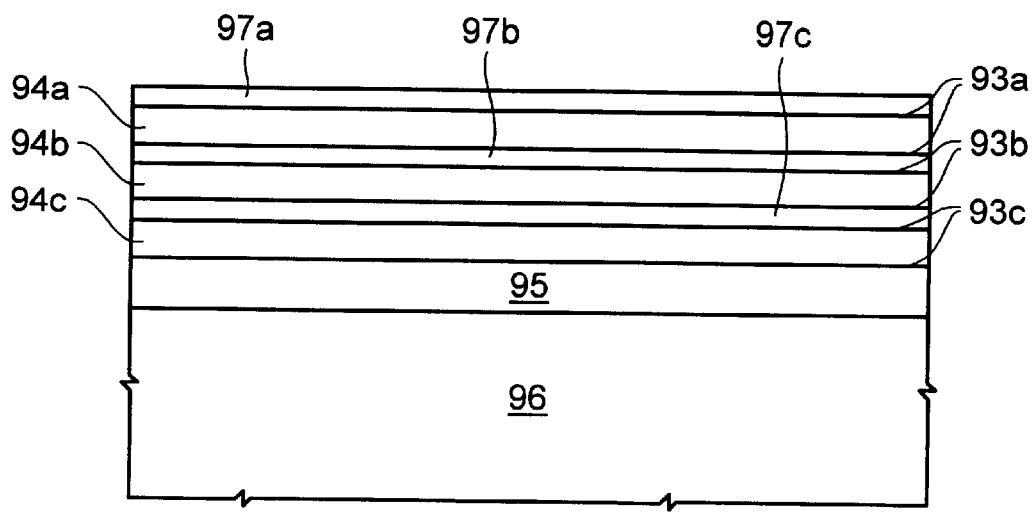
FIG. 10 illustrates layers containing III-V-semiconductor materials and fluorides, which in this case produces a reflector having a mean wavelength of 1.4 μm.

One example of a coating ensemble containing III-V-semiconductor and fluoride layers is shown in FIG. 10 for a laser wavelength of 1.4 µm. Here, three 220-nm-thick layers 94a through 94c of BaF$_2$ in the front and in the back (sandwich-type) are equipped with a 10-nm-thick CaF$_2$ layer 93a through 93c. Between each of these "sandwiches" is a GaAs quarter-wave layer 97a through 97c (100 nm layer thickness). In a coating process, a layer of GaAs 95 is applied to a GaAs substrate 96. The layer 95 serves only to provide a good hold and growth for the subsequent layers.

The difference in the index of refraction between CaF$_2$ and BaF$_2$ is slight, however BaF$_2$ has a high elasticity constant, which greatly reduces the formation of cracks in the coating during the cooling process. Layers containing saturable absorbers may also be integrated onto or into this coating ensemble. For shorter wavelengths, AlGaAs is preferably used in place of GaAs; GaAs exhibits absorption below 900 nm.

The above-described coating ensembles containing layers of GaAs/AlAs or AlGaAs/AlAs have, in contrast to those containing CaF$_2$ and BaF$_2$, a band width that is somewhat too small for a Ti-sapphire laser, in order to permit the full utilization of its band width. Thus, for a broad-band Ti-sapphire laser, a coating ensemble containing CaF$_2$ and BaF$_2$ must be used. In contrast to the above-described coating ensemble having a metallic layer, in this case the advantage lies in the epitactic sequential growth of the layers.

For the semiconductor materials, GaAs, AlGaAs, InGaAs, GaInP, GaInAsP, etc. may be used, and as the fluorides CaF$_2$, BaF$_2$, SrF$_2$, . . . may be used.

Figure 11:
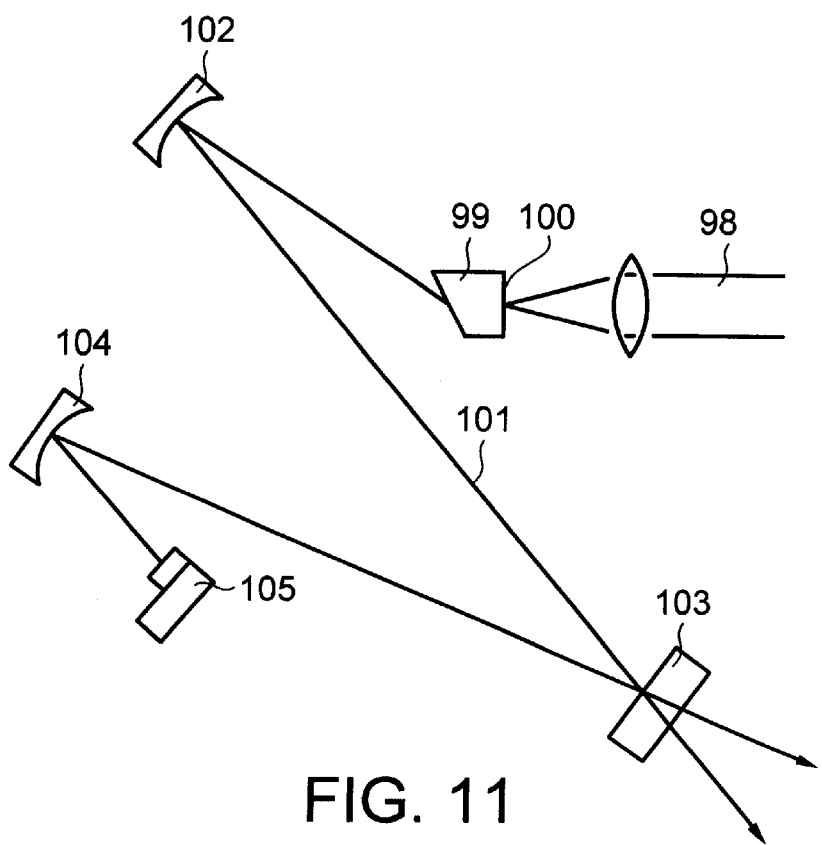
FIG. 11 illustrates a variation on a laser cavity, in which the active medium and the terminal cavity reflector form a single component, FIG. 12 a further variation on a laser cavity in which the active medium in the cavity is designed as a deflecting reflector, and FIG. 13 a further variation having a miniaturized laser cavity.

In addition to the cavity configurations illustrated in FIGS. 5 and 7, others may also be used. The cavity illustrated in FIG. 11 contains a laser crystal 99, through one end 100 of which, reflected for the laser wavelength, is pumped. The resonator wave 101 generated via the laser crystal 99 is deflected by the deflecting reflectors 102, 103, and 104. The laser crystal 99 is optically pumped using the pumping light beam 98. The saturable absorber in one of the above-described coating ensembles is arranged as a terminal cavity reflector 105. The laser beam is coupled out at the deflecting reflector 103.

Figure 12:
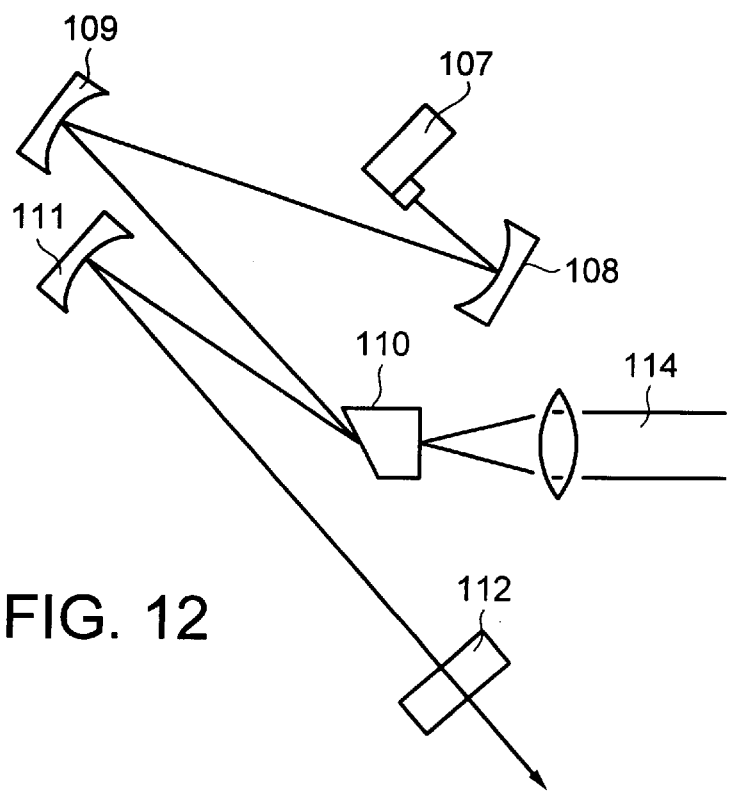

The laser cavity illustrated in FIG. 12 also contains a saturable absorber in one of the above-described coating ensembles. The coating ensemble 107 is integrated into the terminal cavity reflector. In addition, the cavity contains a terminal reflector 112 and four deflecting reflectors 108 through 111, wherein the element 110 acts simultaneously as the active medium (laser crystal) and as a reflector. Laser energy is partially coupled out via the terminal reflector 112. The optical pumping of the laser crystal 110 is accomplished via the pumping light beam 114.

Figure 13:
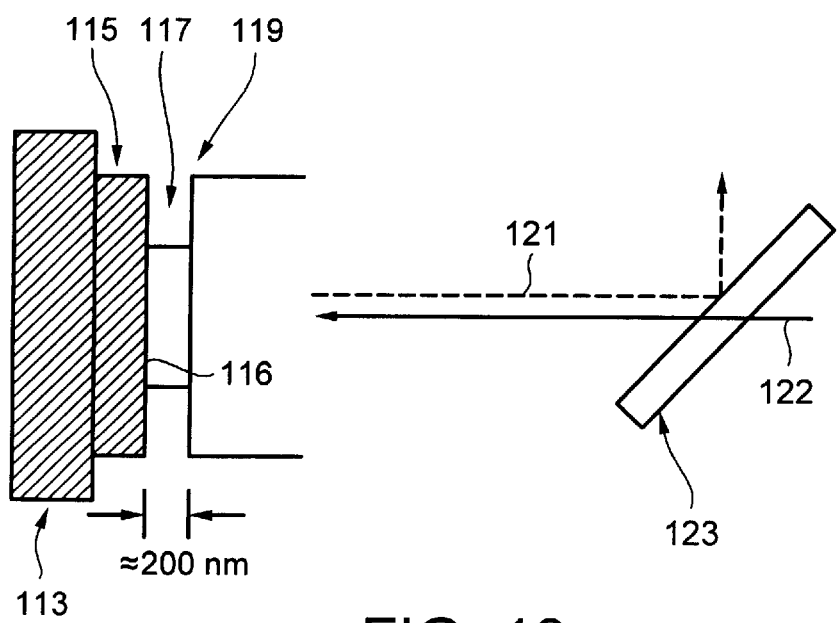

A miniaturized laser cavity for the generation of shorter pulses, similar to the above-described cavities, is shown in FIG. 13. On a small mounting plate 113, a coating ensemble 115 including a saturable absorber, in accordance with one of the above-described constructions, is applied as a terminal cavity reflector. The laser crystal 117 is mounted directly onto this coating ensemble 115. (The crystal may also be attached to the coating ensemble at the position indicated by the number 116.) The thickness of approximately 200 µm for the laser crystal 117 plus the "penetration depth" of the beam into the coating ensemble determine the cavity length. The coupling-out reflector 119 having the proper coating for the laser beam 121 to be coupled out, and for a coupling-in of the pumping light beam 122, is positioned directly adjacent to the laser crystal 117 on the side opposite the ensemble 115. The laser beam 121 and the pumping light beam 122 are separated from one another by a correspondingly coated beam splitter 123.

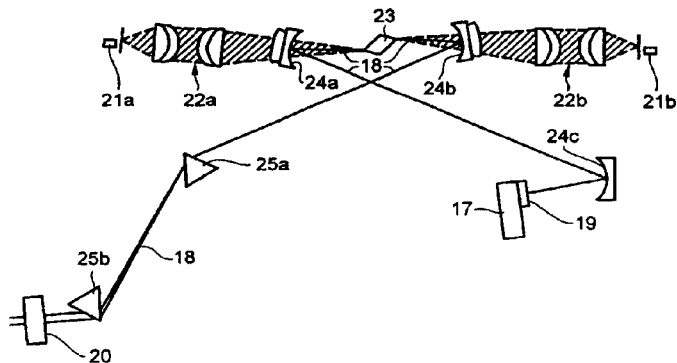

What is claimed is:

1. A method for producing an optical component with a predetermined reflection factor for a laser beam, for generating short laser pulses in a laser cavity, comprising the steps of:

designating a coating ensemble to be applied to a surface of the optical component, the coating ensemble comprised of first and second layers and at least a third layer that contains a saturable absorptive material for the laser beam;

determining individually and mathematically layer thicknesses and positions of the first and second layers, as well as the at least one third layer containing the saturable absorptive material, such that the predetermined reflection factor, with the coating ensemble positioned on the surface of the optical component, is obtained and such that in the at least one third layer a predetermined normalized beam intensity value for the incident laser beam is obtained, with each beam intensity value being chosen such that a desired saturable absorptive effect for generation of the short laser pulses in the laser cavity is produced; and applying the coating ensemble having the determined layer thicknesses and positions on the surface of the optical component.

2. The method in accordance with claim 1, reflection factor of the coating ensemble is predetermined such that the coating ensemble renders the optical component antireflective.

3. The method in accordance with claim 1, characterized in that one layer of the at least one third layer a position in the coating ensemble mathematically having a higher beam intensity gradient, in order to obtain a high absorption change in at least one partial frequency range of a laser cavity beam.

4. The method in accordance with claim 1, wherein the layers of the coating ensemble include semiconductor materials which contain arsenide, a metal or at least one fluoride selected as suitable partners, a semiconductor material such as gallium arsenide, gallium aluminum arsenide, or gallium indium arsenide is used as the at least one third layer.

5. The method in accordance with claim 1, wherein a sequence of layers in the coating ensemble is predetermined such that for an incident laser beams a negative dispersion of group velocity results.

6. The method in accordance with claim 5, wherein in at least one portion of the layers of the coating ensemble a semiconductor material containing a percentage of aluminum is used, a portion of aluminum being predetermined based upon expected mean frequency of a laser cavity beam, such that in layers designed for saturable absorption a saturable absorption can be generated, together with required negative group velocity dispersion, to generate extremely short mode-locked pulses.

7. The optical component, produced in accordance with the method of claim 1, for use in a laser cavity for generation of pulsed laser radiation of a predetermined wavelength in the microsecond to femtosecond range, the coating ensemble including the first and second layers and the at least one third layer wherein adjacent first and second layers have a different optical index of refraction and at least one third layer contains the saturable absorptive material for the pulsed laser radiation, the optical component with the coating ensemble containing the at least one third layer applied to the surface thereof having the predetermined reflection factor and being used as a saturable absorber for the laser beam, the at least one third layer being arranged in the coating ensemble in a position that has a predetermined normalized intensity for an incident laser beam.

8. The optical component in accordance with claim 7, wherein the coating ensemble is designed such that the laser beam having the predetermined wavelength cannot be reflected.

9. The optical component in accordance with claim 7, wherein the at least one third layer is arranged in a position in the coating ensemble in which a higher beam intensity gradient for an incident laser beam is produced with the predetermined wavelength, in order to obtain a high absorption change in at least one partial frequency range in the laser cavity.

10. The optical component in accordance with claim 7, wherein the layers of the coating ensemble are comprised of semiconductor materials which contain arsenide, a metal, or at least one fluoride as significant compound partners, and the at least one third layer is comprised of a semiconductor material such as gallium arsenide, gallium aluminum arsenide, or gallium indium arsenide.

11. The optical component in accordance with claim 7, wherein in at least one portion of the layers in the coating ensemble a semiconductor material containing a percentage of aluminum is used, a portion of aluminum being predetermined based upon expected mean frequency of a laser cavity beam, such that in the at least one third layer a saturable absorption, together with a required negative group velocity dispersion, is achieved for the laser beam to generate extremely short mode-locked pulses.

12. The method in accordance with claim 1, wherein the reflection factor of the coating ensemble is predetermined such that the coating ensemble renders the optical component substantially reflective.

13. The optical component in accordance with claim 7, wherein the coating ensemble is designed such that the laser beam having the predetermined wavelength is substantially reflected.

14. The optical component in accordance with claim 7, wherein the coating ensemble is applied to a GaAs substrate and said coating ensemble comprises:

a plurality of pairs of AlGaAs/GaAs layers on the GaAs substrate;

the first layer is GaAs and on the plurality of AlGaAs/GaAs layers;

the second layer is AlAs and on the first layer, said second layer being relatively thicker than the first layer;

the third layer is a relatively thin GaAs layer functioning as the saturable absorptive material, said third layer on the second layer;

an another second layer on the third layer, said another second layer having a different thickness than the second layer;

a relatively thinnest layer of GaAs on an end portion of said coating ensemble, wherein the saturable absorptive material is in between at least two layers of different thickness and of the same material.

15. The optical component in accordance with claim 7, wherein the coating ensemble is applied to a GaAs substrate and said coating ensemble comprises:

a plurality of pairs of AlGaAs/GaAs layers on the GaAs substrate;

the first layer is GaAs and on the plurality of AlGaAs/GaAs layers;

the second layer is AlAs and on the first layer, said second layer being relatively thicker than the first layer;

the third layer is relatively thin and composed of AlGaAs which functions as the saturable absorptive material, said third layer is on the second layer;

a layer of AlGaAs on the third layer, said layer of AlGaAs having a thickness different than a thickness of the second layer, wherein the saturable absorptive material in between at least two layers of different thickness and different materials.

16. The optical component in accordance with claim 7, wherein the coating ensemble is applied to a GaAs substrate an comprises:

a plurality of pairs of GaAs/AlAs layers on the GaAs substrate;

the second layer layer on the plurality of AlGaAs/GaAs layers, said being a GaAs second layer with a half wave length thickness;

the third layer on the second layer and being a relatively thin layer of InGaAs, said third layer having a higher index of refraction than the first layer; and the first layer being a GaAs layer with a relatively high index of refraction and a quarter wave thickness;

wherein the saturable absorptive material is in between the first and third layers and the first and third layers have a different thickness and a same material.

17. The optical component in accordance with claim 16, wherein the first layer is on an end of the coating ensemble.

18. The optical component in accordance with claim 7, comprising a top layer of a relatively low index of refraction and a thickness of a half wave, the saturable absorptive material having a relatively high index of refraction and being in the middle of said top layer.

19. The optical component in accordance with claim 7, wherein the third layer of saturable absorptive material is in a relatively low layer of GaAs;

said layer of GaAs having a thickness of three quater wavelengths and a high index of refraction; and the third layer arranged asymmetrically within said GaAs layer at a depth of ¼ of a wavelength.

20. The optical component in accordance with claim 7, comprising a metallic Ag layer, and a thin GaAs layer, a relatively thick AlAs layer, the third layer and an AlGaAs layer, in sequence on the Ag layer.

21. The optical component in accordance with claim 19, the third layer being between at least two layers of different thicknesses, different materials, and different indices of refraction.

22. The optical component in accordance with claim 19, the third layer being between at least two layers of the same thickness but different indices of refraction.

23. The optical component in accordance with claim 7, wherein a sequence of layers is predetermined such that for an incident laser beam a negative dispersion of group velocity results.

24. A laser for generating short pulses and having a laser cavity with at least one optical component therein, the at least one optical component being produced with a predetermined reflection factor for a laser beam comprising the steps of:

designating a coating ensemble to be applied to a surface of the at least one optical component, the coating ensemble comprised of first and second layers and at least a third layer that contains a saturable absorptive material for the laser beam;

determining individually and mathematically layer thicknesses and positions of the first and second layers, as well as the at least one third layer containing the saturable absorptive material, such that the predetermined reflection factor, with the coating ensemble positioned on the surface of the optical component, is obtained and such that in the at least one third layer a predetermined normalized beam intensity value for the incident laser beam is obtained, with each beam intensity chosen such that a desired saturable absorptive effect for generating of the short laser pulses in the laser cavity is produced; and applying the coating ensemble having the determined layer thicknesses and positions on the surface of the optical component, the generated short laser pulses having a predetermined wavelength in a microsecond to femtosecond range, the coating ensemble including the first and second layers and the at least one third layer wherein adjacent first and second layers have a different optical index of refraction, the at least one third layer being arranged in the coating ensemble in a position that has the predetermined normalized intensity for the incident laser beam.

25. The laser in accordance with claim 24, wherein a sequence of layers of the component is predetermined such that for an incident laser beam a negative dispersion of group velocity results.

* * * * *

UNITED STATES PATENT AND TRADEMARK OFFICE
CERTIFICATE OF CORRECTION

PATENT NO. : 6,466,604 B1
DATED : October 15, 2002
INVENTOR(S) : Kopf

It is certified that error appears in the above-identified patent and that said Letters Patent is hereby corrected as shown below:

<u>Title page,</u>
Insert -- [73] Assignee: GigaTera AG, Dietikon, (CH) --.

Signed and Sealed this

Twenty-eighth Day of January, 2003

JAMES E. ROGAN
*Director of the United States Patent and Trademark Office*

UNITED STATES PATENT AND TRADEMARK OFFICE
Certificate

Patent No. 6,466,604 B1                                          Patented: October 15, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Daniel Kopf, Zurich, Switzerland; and Ursula Keller-Weingarten, Uitikon, Switzerland.

Signed and Sealed this Thirtieth Day of November 2004.

*PAUL IP*
*Supervisory Patent Examiner*
*Art Unit 2828*

UNITED STATES PATENT AND TRADEMARK OFFICE
CERTIFICATE OF CORRECTION

PATENT NO. : 6,466,604 B1
DATED : October 15, 2002
INVENTOR(S) : Keller-Weingarten et al.

It is certified that error appears in the above-identified patent and that said Letters Patent is hereby corrected as shown below:

Title page,
Insert Item -- [73] Assignee: Gigatera AG. Dietikon (CH) --.

Signed and Sealed this

First Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,466,604 B1
DATED : October 15, 2002
INVENTOR(S) : Keller-Weingarten et al.

It is certified that error appears in the above-identified patent and that said Letters Patent is hereby corrected as shown below:

Delete title page and substitute the attached title page.

This certificate supersedes Certificate of Correction issued November 1, 2005.

Signed and Sealed this

Twentieth Day of December, 2005

JON W. DUDAS
*Director of the United States Patent and Trademark Office*

(12) United States Patent
Keller-Weingarten, et al.

(10) Patent No.: US 6,466,604 B1
(45) Date of Patent: *Oct. 15, 2002

(54) OPTICAL COMPONENT FOR GENERATING PULSED LASER RADIATION

(76) Inventors: Ursula Keller-Weingarten, Uitikon (CH); Daniel Kopf, Zurich (CH)

(73) Assignee: Gigatera AG, Dietikon (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 298 days.

(21) Appl. No.: 08/952,478

(22) PCT Filed: May 15, 1996

(86) PCT No.: PCT/CH96/00185
§ 371 (c)(1),
(2), (4) Date: Nov. 19, 1997

(87) PCT Pub. No.: WO96/36906
PCT Pub. Date: Nov. 21, 1996

(30) Foreign Application Priority Data

May 19, 1995 (CH) .............................. 1499/95

(51) Int. Cl.$^7$ .............................. H01S 3/08; G02B 1/10
(52) U.S. Cl. .............................. 372/99; 359/584; 372/18; 372/25
(58) Field of Search .............................. 372/99, 102, 49, 372/11, 18, 20, 25; 359/584, 586, 589

(56) References Cited

U.S. PATENT DOCUMENTS

| 4,860,296 A | 8/1989 | Chemia et al. ............... 372/44 |
| 5,265,107 A | 11/1993 | Delfyett, Jr. .................. 372/11 |
| 5,627,854 A | 5/1997 | Knox ............................ 372/99 |

FOREIGN PATENT DOCUMENTS

| EP | 0 541 304 A1 | 5/1993 |
| EP | 0 609 015 A1 | 8/1994 |
| EP | 073261382 | * 9/1996 |
| WO | WO 85/03171 | 7/1985 |

OTHER PUBLICATIONS

Brovelli et al, "Self–starting Soliton Mode–locked Ti–Sapphire Laser Using a Thin Semiconductor Saturable Absorber", Electronics Letters, vol. 31, No. 4, pp. 287–289, Feb. 1995.*

"Revolution in the Generation of Ultra–Short Pulses," U. Keller, TR Transfer No. 23, 1994, pp. 22–24. (No Month).

"Laser Principles and Applications," H. Weber et al., Physik Verlag GMbH, Weinhein/Bergstr., 1972, pp. 144–157, (No Month).

"Principles of Optics," M. Born et al., Pergamon Press, 1975, pp. 55–70, (No Month).

(List continued on next page.)

Primary Examiner—James W. Davie

(57) ABSTRACT

The optical component designed preferably for use in a laser cavity for the generation of a pulsed laser beam, especially a mode-coupled beam in the microsecond to the femtosecond range, contains a coating ensemble that acts as a saturable absorber, contains several layers, and is wavecoupled and "etalon-free," having at least one saturable absorptive layer. The sequence of layers in the coating ensemble can be laid out such that for an incident cavity beam a negative dispersion of the group velocity (negative group delay dispersion and negative group velocity dispersion) also results. In the optical component which acts among other things as a saturable absorber and can be used as such, separate, individual, discrete optical elements need not be assembled in a sandwich-type construction with minimization. Instead, the optical component is a coating ensemble in which each individual layer, together with the remainder of the ensemble, contributes to the phase-coupled overall behavior of the incident beam. One or more layers which exhibit the saturable absorptive properties may be positioned in this ensemble, naturally allowing for phase-constant relations, such that an optimal, in this case a saturable absorptive, effect can be achieved.

25 Claims, 11 Drawing Sheets